United States Patent
Waag

(10) Patent No.: US 6,695,099 B1
(45) Date of Patent: Feb. 24, 2004

(54) TWIN PISTON SINGLE BORE BRAKE CALIPER APPARATUS

(75) Inventor: James R. Waag, Miamisburg, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/342,884

(22) Filed: Jan. 15, 2003

(51) Int. Cl.⁷ ............................................. F16D 55/228
(52) U.S. Cl. .................. 188/72.5; 188/70 R; 188/71.1; 188/72.3; 188/72.4
(58) Field of Search .............................. 188/70 R, 71.1, 188/72.1, 72.3, 72.4, 72.5, 72.6, 73.1, 71.4

(56) References Cited

U.S. PATENT DOCUMENTS

| | | | | |
|---|---|---|---|---|
| 3,245,500 A | * | 4/1966 | Hambling et al. | 188/72.6 |
| 3,402,790 A | * | 9/1968 | Rath | 188/72.5 |
| 3,421,603 A | * | 1/1969 | Schuchmann et al. | 188/72.4 |
| 3,428,152 A | * | 2/1969 | Hoenick | 188/72.5 |
| 3,448,831 A | * | 6/1969 | Newstead | 188/71.3 |
| 3,470,984 A | * | 10/1969 | Goddard | 188/72.5 |
| 3,493,084 A | * | 2/1970 | Maurice | 188/72.5 |
| 3,712,422 A | * | 1/1973 | Haraikawa et al. | 188/72.3 |
| 3,912,051 A | * | 10/1975 | Yokoi et al. | 188/72.5 |
| 4,611,691 A | * | 9/1986 | Gornall | 188/71.8 |
| 4,715,479 A | | 12/1987 | Buckley | |
| 5,253,736 A | * | 10/1993 | Kohler | 188/59 |

\* cited by examiner

Primary Examiner—Christopher P. Schwartz
Assistant Examiner—Devon Kramer
(74) Attorney, Agent, or Firm—Scott A. McBain

(57) ABSTRACT

A braking apparatus and method are provided for applying a braking force to the inboard and outboard sides of a brake rotor, through the use of a pair of pistons disposed in a back-to-back relationship in a cylinder bore of a housing, and defining a space between them in the cylinder bore for receipt of a pressurized fluid. The rotor is rotatable about a rotor axis, and the cylinder bore defines a bore axis extending parallel to the rotor axis. A first piston of the pair of pistons is slidably disposed in the cylinder bore for movement in a first direction along the bore axis toward the inboard side of the rotor for applying a braking force to the inboard side of the rotor, and the second piston of the pair of pistons is slidably disposed in the cylinder bore for movement in a second direction opposite the first direction along the bore axis for applying a braking force to the outboard side of the rotor. A movable bridge element is slidingly attached to the housing for transmitting a braking force from the second piston to the outboard side of the rotor.

17 Claims, 3 Drawing Sheets

TWIN PISTON SINGLE BORE BRAKE CALIPER APPARATUS

TECHNICAL FIELD OF THE INVENTION

This invention relates to applying a braking force to a rotor, and more particularly to a disc brake caliper of the type used in vehicles.

BACKGROUND OF THE INVENTION

In a typical disc brake apparatus for a vehicle having wheels, such as an automobile a truck, or a motorcycle, a disc brake caliper apparatus attached to a frame of the vehicle is used for applying braking force to the sides of a rotor attached to one or more of the wheels of a vehicle. The calipers used presently, however, do not fully disengage from the sides of the rotor between applications of braking force. Brake linings of the caliper remain in contact with the sides of the rotor creating a drag force on the rotor that reduces fuel economy of the vehicle.

As shown in FIG. 1, a typical disc brake apparatus 10 includes a rotor 12 and a brake caliper 14 attached to a common support 16, such as a steering knuckle, or the chassis of a vehicle. The rotor 12 is mounted for rotation with a wheel of the vehicle, about a rotor axis 18 coincident with the axis of the axle about which the wheel rotates.

The caliper 14 includes a caliper housing 20 that is slidably mounted on a pair of mounting pins 22 to the support 16, in a manner that allows the caliper 14 to move a short distance toward or away from the support 16, during operation of the brake 10. A flexible dust boot 24 is provided around the pins 22 in the space between the housing 14 and the support 16.

The housing 20 includes a circumferential shaped slot 26 that fits over a portion of the periphery of the rotor 12, and to provide clearance for a pair of brake shoes 28, 29 having linings 30 positioned to be clamped against an inboard and an outboard side 32, 34 of the rotor 12. The brake shoes 28, 29 are suspended on the pins 22 in a manner that lets the shoes 28, 29 slide on the pins 22. Tabs 46, 48, and 50 on the brake shoes 28, 29 transfer the braking loads to the housing 20 during vehicle braking.

The caliper 14 also includes a piston 36 mounted in a cylinder bore 38 to be movable along a bore axis 40 for moving the inboard brake shoe 28 into contact with the inboard side 32 of the rotor 12, for applying a braking force against the inboard side 32 of the rotor 12, when pressurized fluid is introduced into the cylinder bore 38 in a space 42 behind the piston 36.

As the piston 36 applies braking force to clamp the inboard brake shoe 28 against the inboard side 32 of the rotor 12, the pressurized fluid in the space 42 in the cylinder bore 38 behind the piston 36 causes the housing 20 to move in an opposite direction along the bore axis 40. This movement of the housing 20 pulls the outboard lining 30 of the outboard brake shoe 29 into contact with the outboard side 34 of the rotor 12, creating a clamping effect, so that the motion of the piston 36 toward the inboard side 34 of the rotor 12 applies braking force to both the inboard and outboard sides 32, 34 of the rotor 12.

When fluid pressure is released in the space 42 behind the piston 36, the piston 36 is retracted a few thousandths of an inch by the action of a specially designed seal 44, between the cylinder bore 38 and the piston 36, in a manner known in the art. With the piston 36 retracted, the inboard brake shoe 28 is free to move away from the inboard surface 32 of the rotor 12.

There is no mechanism provided, however, for moving the outboard brake shoe 29 away from the outboard side 34 of the rotor 12. This results in undesirable drag between the lining 30 on the outboard shoe 29 and the outboard side 34 of the rotor 12, thereby reducing fuel economy of the vehicle to which the brake 10 is attached.

In addition, because the caliper 14 and the brake shoes 28, 29 must slide on the pins 22, and yet still be capable of withstanding braking loads transferred to the caliper housing 20 by the tabs 46, 48, and 50 on the brake shoes 28, 29, for proper operation of the brake 10, the caliper housing 20 is a complex shape, and is typically produced by an expensive process such as casting the housing from iron or steel, and carrying out complex machining operations to bring the housing to its final shape. Caliper housings 20 of the type used in the past are also heavy.

What is needed, therefore, is an improved disc brake apparatus providing a solution to one or more of the problems and disadvantages described above.

SUMMARY OF THE INVENTION

The invention provides an improved braking apparatus for applying a braking force to the inboard and outboard sides of a brake rotor, through the use of a pair of pistons disposed in a back-to-back relationship in a cylinder bore of a housing, and defining a space between them in the cylinder bore for receipt of a pressurized fluid.

In one form of the invention, the rotor is rotatable about a rotor axis, and the cylinder bore defines a bore axis extending parallel to the rotor axis. A first piston of the pair of pistons is slidably disposed in the cylinder bore for movement in a first direction along the bore axis toward the inboard side of the rotor for applying a braking force to the inboard side of the rotor, and the second piston of the pair of pistons is slidably disposed in the cylinder bore for movement in a second direction opposite the first direction along the bore axis for applying a braking force to the outboard side of the rotor.

A braking apparatus, according to the invention, may further include a movable bridge element slidingly attached to the housing for transmitting a braking force from the second piston to the outboard side of the rotor.

The invention may also take the form of a method for applying a braking force to the inboard and outboard sides of a brake rotor by connecting a first piston and a second piston disposed in a back-to-back relationship in the cylinder bore and defining a space between them in a cylinder bore for receipt of a pressurized fluid, to the inboard and outboard sides of the rotor, and introducing a pressurized fluid into the space between the first and second pistons, so that the first and second pistons generate a braking force applied to the first and second sides of the rotor.

The foregoing and other features and advantages of the invention will become further apparent from the following detailed description of exemplary embodiments, read in conjunction with the accompanying drawings. The detailed description and drawings are merely illustrative of the invention rather than limiting, the scope of the invention being defined by the appended claims and equivalents thereof.

DETAILED DESCRIPTION

Figure 1:
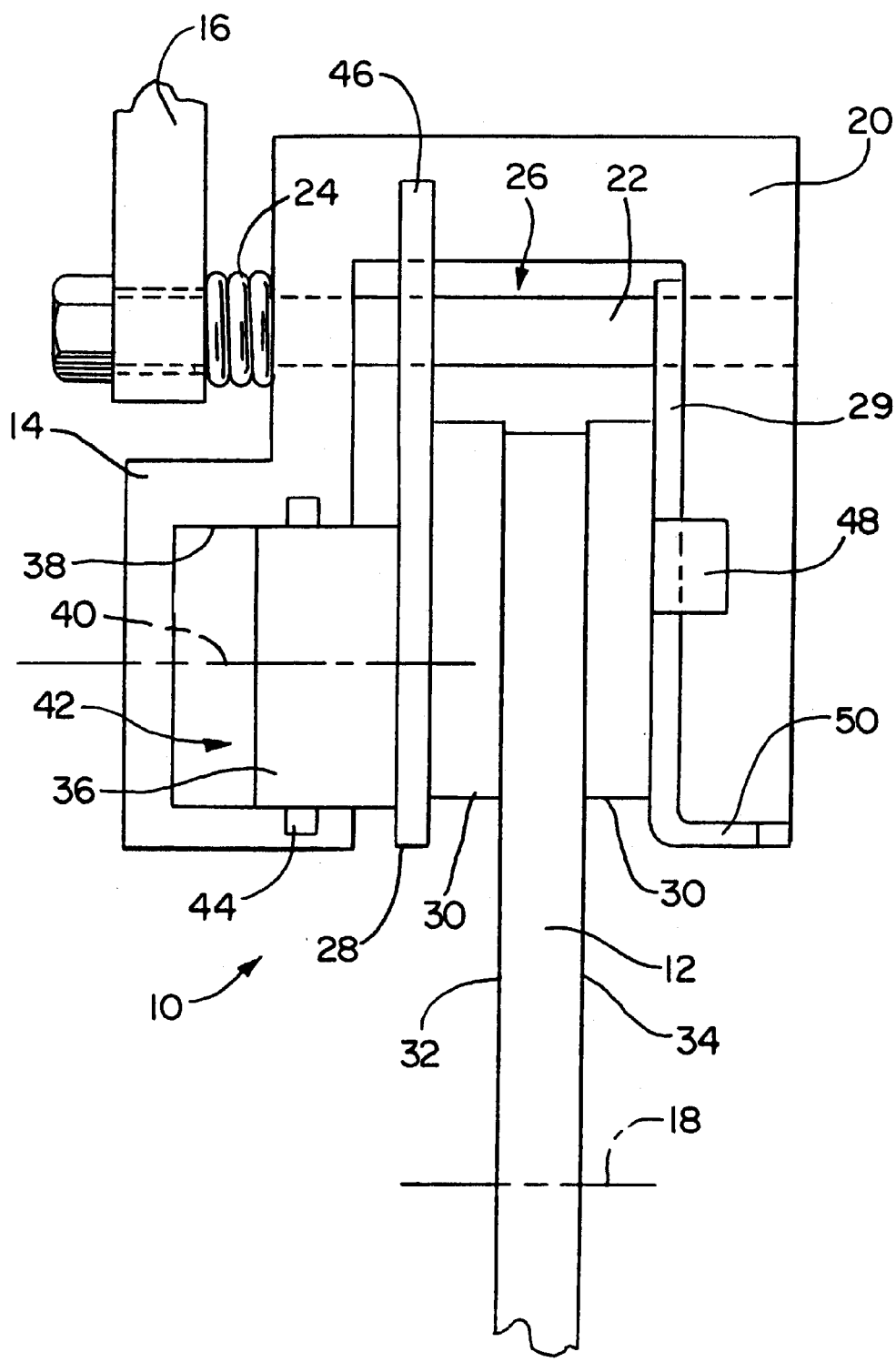
FIG. 1 is a schematic cross section of a typical prior art disc brake.
Figure 2:
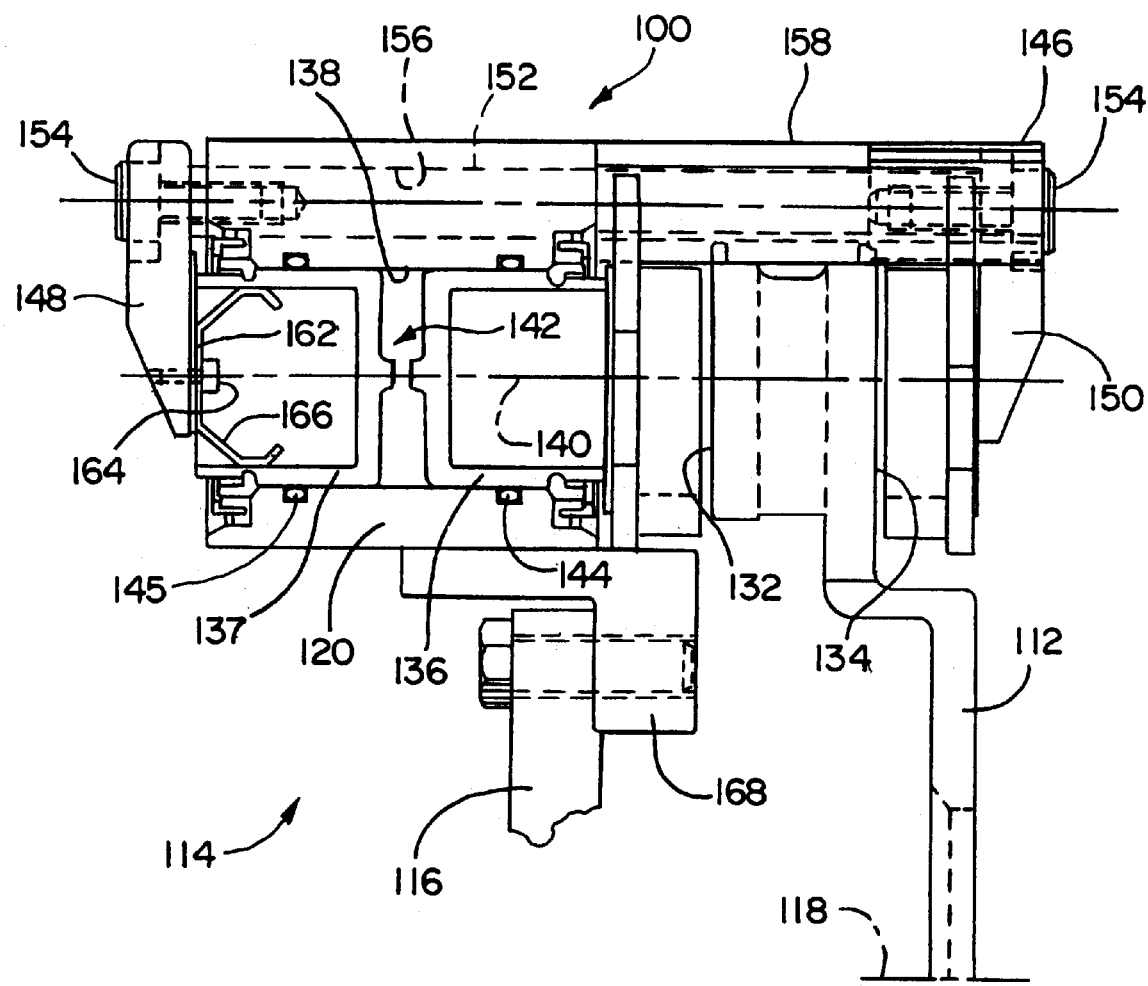
FIG. 2 is a cross section of an exemplary embodiment of a brake apparatus according to the invention.
Figure 3:
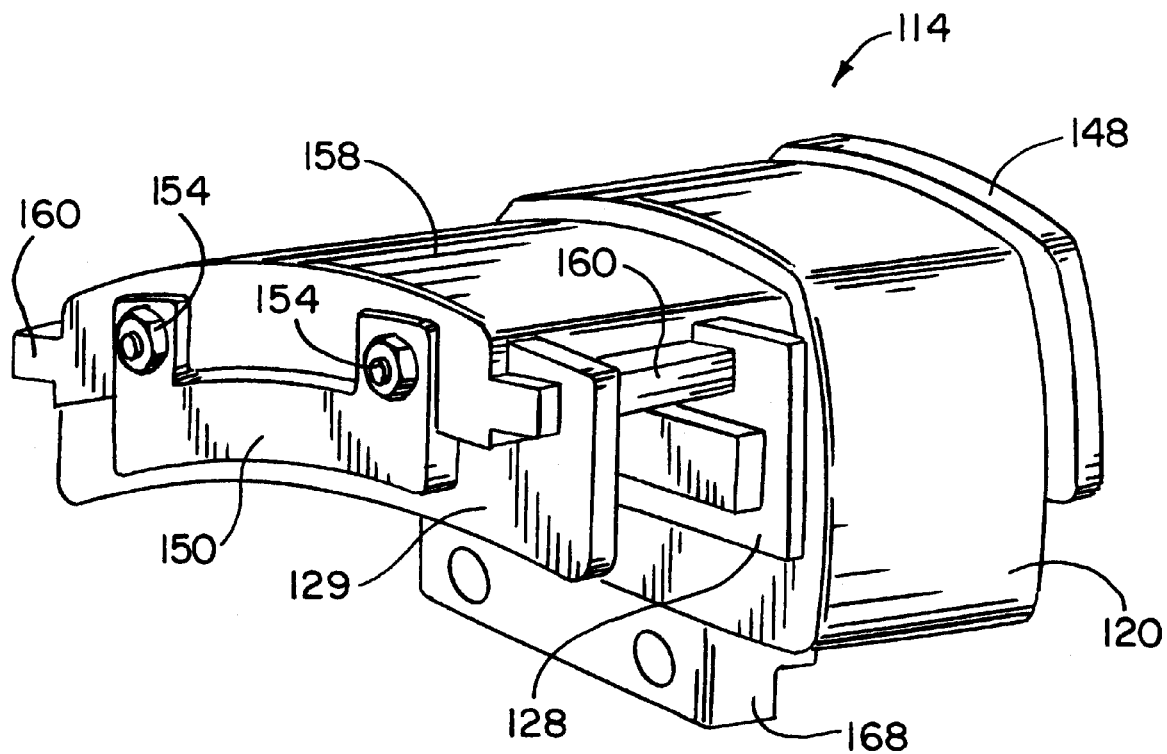
FIG. 3 is perspective view of a brake caliper of the brake apparatus of FIG. 2, according to the invention.

FIGS. 2 and 3 show a first exemplary embodiment of a braking apparatus 100 for applying a braking force to the inboard and outboard sides 132, 134 of a brake rotor 112. The brake apparatus 100 includes a caliper 114 having a pair of pistons 136, 137 for applying braking force to the inboard and outboard sides 132, 134 of the rotor 112. The pistons 136, 137 are disposed in a back-to-back relationship in a cylinder bore 138 of a housing 120, and define a space 142 between them in the cylinder bore 138 for receipt of a pressurized fluid.

The rotor 112 is rotatable about a rotor axis 118, and the cylinder bore 138 defines a bore axis 140 extending parallel to the rotor axis 118. The first piston 136 of the pair of pistons 136, 137 is slidably disposed in the cylinder bore 138 for movement in a first direction along the bore axis 140 toward the inboard side 132 of the rotor 112 for applying a braking force to the inboard side 132 of the rotor 112. The second piston 137 of the pair of pistons 136, 137 is slidably disposed in the cylinder bore 138 for movement in a second direction opposite the first direction along the bore axis 140 for applying a braking force to the outboard side 134 of the rotor 112.

A movable bridge element 146 is slidingly attached to the housing 120 for transmitting braking force from the second piston 137 to the outboard side 134 of the rotor 112. The movable bridge element 146 includes a pusher plate 148, a puller plate 150, and a pair of slider elements, in the form of guide rods 152 that are internally threaded at both ends thereof for attachment to the pusher and puller plates 148, 150 with cap screws 154. The pusher plate 148 receives a braking force from the second piston 137 that is transferred through the guide rods 152 and the puller plate 150 to the outboard side 134 of the rotor 112. Each of the guide rods 152 passes through and is slidingly supported in guide bores 156 passing through the housing 120.

The housing 120 of the exemplary embodiment also includes a fixed bridge element 158 thereof, cantilevered from the remainder of the housing 120, and spanning the rotor 112 and inboard and outboard shoe and lining assemblies 128, 129. As best seen in FIG. 3, the fixed bridge element 158 includes a pair of guide ribs 160, one on each on each side of the fixed bridge element 158, adapted for engaging and slidingly supporting the inboard and outboard shoe and lining assemblies 128, 129.

The inboard shoe and lining assembly 128 is slidingly supported by the guide ribs 160 of the fixed bridge element 158 of the housing 120 between the inboard side 132 of the rotor 112 and the housing 120, where the inboard piston 136 can bear directly against the inboard shoe and lining assembly 128, when pressurized fluid is introduced into the space 142 between the first and second pistons 128, 129. The outboard shoe and lining assembly 129 is slidingly supported by the guide ribs 160 of the fixed bridge element 158 of the housing 120 between the outboard side 134 of the rotor 112 and the puller plate 150, so that braking force from the second piston 137 can transferred by the movable bridge element 146 to bear against the outboard board shoe and lining assembly 129, and thereby applied to the outboard side 134 of the rotor 112, when pressurized fluid is introduced into the space 142 between the first and second pistons 128, 129.

The brake caliper 114 of the brake apparatus 100 further includes a first return element, in the form of a seal 144 operatively attached between the cylinder bore 138 in the housing 120, the first piston 136. The first return element urges the first piston 136 to retract into the cylinder bore 138, and thereby relieve braking pressure acting through the inboard shoe and lining assembly 128 on the inboard side 132 of the rotor 112, when pressure is reduced or removed from the space 142 between the first and second pistons 136, 137.

The brake caliper 114 of the brake apparatus 100 further includes a second return element, also in the form of a seal 145 operatively attached between the cylinder bore 138 in the housing 120, the second piston 137. The second return element urges the second piston 137 to retract into the cylinder bore 138, and thereby relieve braking pressure acting through the movable bridge element 146 and the outboard shoe and lining assembly 129 on the outboard side 134 of the rotor 112, when pressure is reduced or removed from the space 142 between the first and second pistons 136, 137.

In the exemplary embodiment shown in FIG. 2, the caliper 114 further includes a piston clip 162, attached with a screw 164 to the pusher plate 148, having several fingers 166 that engage the second piston 137. With the piston clip 162 attaching the second piston 137 to the pusher plate 148 of the movable bridge element 146, the second return element 145, acting on the second piston 137, pulls the puller plate 150 of the movable bridge element 146 away from the outboard side 134 of the rotor 122, when pressure is reduced or removed in the space 142 between the first and second pistons 136, 137. With the puller plate 150 pulled away from the outboard side 134 of the rotor 112, the outboard shoe and lining assembly 129 is free to move outward from the rotor 112, so that the rotor 112 may turn freely without incurring drag from the lining 130 on the outer shoe and lining assembly 129.

Those having skill in the art will recognize that a brake apparatus 100 according to the invention provides an apparatus and method for positively retracting the outboard brake shoe and lining 129, to allow the rotor 112 to rotate freely without drag, thereby improving fuel efficiency of a vehicle incorporating a brake apparatus according to the invention.

A braking system according to the invention provides a number of other advantages, as compared to the prior brake apparatus described in the Background section above.

Because the housing 120 of the caliper 114, in the invention, does not need to move in relation to the rotor 112 or the support 116 upon which the caliper 114 and rotor 112 are mounted, as was required in the prior art, the housing 120 can be solidly bolted or otherwise fixedly attached to the support 116 through a flange 168, or other mounting feature extending from the housing 114. Having the housing 114 solidly bolted to the support 116, allows all torque generated by applying braking force to the inboard side 132 of the rotor 112, by the inboard shoe and lining assembly 128 to be reacted directly into the support through the housing 120, rather than through the mounting pins 22 as was the case in prior disc brakes. In addition, the torque from the outboard shoe and lining assembly 129 is also reacted through the housing 120 and into the support 116 in a far more direct and better supported manner than was the case in prior disc brakes, through guide pins 152 bearing against the entire length of the guide bores 156. Because the torque is reacted in more direct manner, the housing 120 and guide pins 152 can be made considerably smaller and lighter in weight than was the case in prior disc brakes. The housing 120 can also be made of light-weight material such as aluminum, or titanium, rather than iron or steel as was required in prior disc brake designs.

The housing 120 utilizes through-bores for the cylinder bore 138 and the guide bores 156, thereby allowing the housing 120 to be formed from an extruded blank requiring only minimal finish machining, rather than from a significantly more complex and expensive, machined, cast, iron or steel, blank as was the case in prior disc brakes. The fixed bridge 158, including the guide ribs 160 for engaging the shoe and lining assemblies 128, 129 can also be formed in a number of ways, including extrusion, either integrally with the remainder of the housing 120, or as a separate part that is subsequently fixedly attached, by a process such as bolting, welding, press-fitting or shrink-fitting, to the remainder of the housing 120 to facilitate manufacturing of the housing 120. The ability to form the housing 120 and fixed bridge element 158 by a number of economical processes provides a caliper 114 that can be manufactured in a considerably more straight-forward and less costly manner than was possible with prior disc brake calipers.

While the embodiments of the invention disclosed herein are presently considered to be preferred, various changes and modifications can be made without departing from the spirit and scope of the invention. For example, the housing need not include the fixed bridge element 158, and the shoe and lining assemblies 128, 129 may be slidingly supported on the guide rods 152, in a manner similar to that used in prior disc brakes. Even with this arrangement, the design of the housing 120 and caliper 114 of the invention provide significant advantages in manufacturability and in more efficiently and effectively reacting torque. The attachment between the pusher plate 148 and the second piston 137 can be provided in many other ways than through the piston clip 162. The movable bridge element 158 may be slidably attached to the housing 120 in many other ways, such as a dovetailed sliding joint between the housing 120 and the movable bridge element 158. The flange 168 may be eliminated, and preferably be replaced by through-holes in the housing 120, in embodiments where the housing 120 has a shape that allows the mounting holes to be placed directly into the housing 120 without the flange 168.

I wish to expressly state that the invention may be used in braking applications other than those associated with braking wheels on a vehicle. Also the terms inboard and outboard used throughout the foregoing disclosure and the appended claims are used to indicate a relative position of the elements of the invention with respect to one another. In other embodiments of the invention it may be more useful and entirely proper to replace the words inboard and outboard with terms such as: upper and lower; first and second; left and right, inside outside.

The scope of the invention is indicated in the appended claims, and all changes or modifications within the meaning and range of equivalents are intended to be embraced therein.

What is claimed is:

1. A brake caliper apparatus for applying a braking force to a brake rotor that is rotatable about a rotor axis and defines an inboard side and an outboard side of the brake rotor, the caliper apparatus comprising,
   a caliper housing including a cylinder bore defining a bore axis extending parallel to the rotor axis; and
   a first and a second piston slidably disposed in a back-to-back relationship in the cylinder bore and defining a space between them in the cylinder bore for receipt of a pressurized fluid;
   the caliper housing including a bracket for fixedly attaching the housing to a support structure operatively connected to the rotor in a manner precluding movement of the housing toward or away from the rotor;
   the first piston being slidably disposed in the cylinder bore for movement in a first direction along the bore axis toward the inboard side of the rotor for applying a braking force to the inboard side of the rotor, and the second piston being slidably disposed in the cylinder bore for movement in a second direction opposite the first direction along the bore axis for applying a braking force to the outboard side of the rotor.

2. The apparatus of a claim 1 further including a return element operatively attached between the housing and one of the first piston for urging the piston to retract from the inboard side of the rotor.

3. The apparatus of claim 1 further including a return element operatively attached between the housing and the second piston for urging the piston to retract into the cylinder bore.

4. The apparatus of claim 1 further comprising:
   a first return element operatively attached between the housing and the fist piston for urging the first piston to retract from the inboard side of the rotor; and
   a second return element operatively attached between the housing and the second piston for urging the second piston to retract into the cylinder bore.

5. A brake caliper apparatus for applying a braking force to a brake rotor that is rotatable about a rotor axis and defines an inboard side and an outboard side of the rotor, the caliper apparatus comprising:
   a caliper housing including a cylinder bore defining a bore axis extending parallel to the rotor axis;
   a first and a second piston slidably disposed in a back-to-back relationship in the cylinder bore and defining a space between them in the cylinder bore for receipt of a pressurized fluid; and
   a movable bridge element slidingly attached to the housing for transmitting a braking force from the second piston to the outboard side of the rotor;
   the first piston being slidably disposed in the cylinder bore for movement in a first direction along the bore axis toward the inboard side of the rotor for applying a braking force to the inboard side of the rotor, and the second piston being slidably disposed in the cylinder bore for movement in a second direction opposite the first direction along the bore axis for applying a braking force to the outboard side of the rotor.

6. The apparatus of claim 5 wherein the movable bridge element is attached to the second piston for movement therewith.

7. The apparatus of claim 5 wherein the movable bridge element includes a pusher plate thereof for receiving a braking force from the second piston and a puller plate thereof for applying a braking force to the outboard side of the rotor.

8. The apparatus of claim 7 wherein the movable bridge element includes a slider element slidingly attached to the housing, spanning the housing and rotor, and having an inboard end thereof attached to the pusher plate and an outboard end thereof attached to the puller plate.

9. The apparatus of claim 8 wherein the housing includes a through bore for receiving the slider element.

10. The apparatus of claim 9 wherein the slider element comprises one or more slide rods and the housing includes a through bore for each slide rod.

11. The apparatus of claim 7 further comprising:

an inboard shoe and lining assembly slidingly supported by the housing and disposed between the inboard side of the rotor and the housing; and an outboard shoe and lining assembly slidingly supported by the housing and disposed between the puller plate and the outboard side of the rotor.

12. The apparatus of claim 11 wherein the housing further includes a fixed bridge element spanning the rotor and inboard and outboard shoe and lining assemblies and adapted for engaging and slidingly supporting the inboard and outboard shoe and lining assemblies.

13. A method for applying a braking force to a brake rotor having an inboard side and an outboard side and operatively connected to a support structure for rotation relative to the support structure about a rotor axis, the method comprising:

providing a caliper housing including a cylinder bore defining bore axis extending parallel to the rotor axis, and a first and a second piston slidably disposed in a back-to-back relationship in the cylinder bore and defining a space between them in the cylinder bore for receipt of a pressurized fluid;

fixedly attaching the cylinder hosing to a support structure in a manner that precludes movement of the housing toward or away from the rotor;

connecting the first piston for applying a braking force to the inboard side of the rotor, and connecting the second piston for applying a braking force to the outboard side of the rotor, when pressurized fluid is introduced into the space between the first and second pistons; and introducing a pressurized fluid into the space between the first and second pistons, whereby the first and second pistons respectively generate the braking forces applied to the first and second sides of the rotor.

14. The method of claim 13 further comprising removing a portion of the pressurized fluid from the space between the pistons, to thereby reduce the braking forces applied to the inboard and outboard sides of the rotor.

15. The method of claim 14 further comprising retracting the first and second pistons toward one another in the cylinder bore.

16. The method of claim 13 wherein the first piston is slidably disposed in the cylinder bore for movement in a first direction along the bore axis toward the inboard side of the rotor for applying the braking force to the inboard side of the rotor, and the second piston is slidably disposed in the cylinder bore for movement in a second direction opposite the first direction along the bore axis for applying the braking force to the outboard side of the rotor, and the method further comprises:

applying the braking force to the inboard side of the rotor with the first piston, and applying the braking force to the second side of the rotor with the second piston.

17. A braking apparatus for applying a braking force to a brake rotor having an inboard side and an outboard side, the apparatus comprising:

a housing having a cylinder bore that defines a bore axis extending parallel to the rotor axis;

a pair of pistons for applying braking force to the inboard and outboard sides of the rotor; and a movable bridge element slidingly attached to the housing for transmitting a braking force from the second piston to the outboard side of the rotor;

the pistons disposed in a back-to-back relationship in the cylinder bore of the housing, and defining a space between them in the cylinder bore for receipt of a pressurized fluid;

the first piston of the pair of pistons slidably disposed in the cylinder bore for movement in a first direction along the bore axis toward the inboard side of the rotor for applying a braking force to the inboard side of the rotor, and the second piston of the pair of pistons slidably disposed in the cylinder bore for movement in a second direction opposite the first direction along the bore axis for applying a braking force to the outboard side of the rotor through the movable bridge element.

\* \* \* \* \*